(12) United States Patent
Nagashima et al.

(10) Patent No.: US 7,579,792 B2
(45) Date of Patent: Aug. 25, 2009

(54) HYBRID MOTOR BOOST SYSTEM AND METHODS

(75) Inventors: James M. Nagashima, Cerritos, CA (US); Brian A Welchko, Torrance, CA (US); Peter J. Savagian, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 172 days.

(21) Appl. No.: 11/738,886

(22) Filed: Apr. 23, 2007

(65) Prior Publication Data

US 2008/0258655 A1 Oct. 23, 2008

(51) Int. Cl.
*H02P 5/00* (2006.01)
(52) U.S. Cl. ........................ 318/105; 318/126; 318/800; 318/801; 318/400.26; 363/40; 363/56.02; 363/71
(58) Field of Classification Search ................. 318/105, 318/122, 126, 133, 800, 801, 722, 400.26–29; 363/40, 45, 46, 56.01, 56.02, 60, 65, 71
See application file for complete search history.

(56) References Cited

U.S. PATENT DOCUMENTS

| | | | |
|---|---|---|---|
| 4,491,778 A | 1/1985 | Knox et al. | |
| 5,589,743 A | 12/1996 | King | |
| 6,242,884 B1 * | 6/2001 | Lipo et al. | 318/808 |
| 6,429,612 B1 | 8/2002 | Kume et al. | |
| 6,462,974 B1 | 10/2002 | Jadric | |
| 7,009,856 B2 * | 3/2006 | Moon et al. | 363/37 |
| 7,057,371 B2 * | 6/2006 | Welchko et al. | 318/400.27 |
| 7,099,756 B2 * | 8/2006 | Sato | 701/22 |
| 7,154,237 B2 * | 12/2006 | Welchko et al. | 318/400.27 |
| 7,199,535 B2 * | 4/2007 | Welchko et al. | 318/105 |
| 7,294,984 B2 * | 11/2007 | Urakabe et al. | 318/378 |
| 2005/0231152 A1 | 10/2005 | Welchko et al. | |
| 2006/0052915 A1 * | 3/2006 | Sato | 701/22 |
| 2006/0108957 A1 * | 5/2006 | Urakabe et al. | 318/139 |
| 2006/0164027 A1 | 7/2006 | Welchko et al. | |
| 2006/0164028 A1 | 7/2006 | Welchko et al. | |

OTHER PUBLICATIONS

Maamoun A., et al., "Near Unity Power Factor Single-Phase to Three-Phase Converter Feeding an Induction Motor," Proceedings of the 24th IASTED International Multi-Conference, Artificial Intelligence and Applications, Feb. 13-16, 2006, Innsbruck, Austria, pp. 131-135.

* cited by examiner

*Primary Examiner*—Bentsu Ro
*Assistant Examiner*—Thai Dinh

(57) ABSTRACT

An electrical system for a vehicle includes a power source providing electrical power to a first and a second electrical motor. Each motor has two or more windings, and each winding has a first end and a second end. A boost link such as a battery or capacitor is configured to store electrical energy for subsequent retrieval and use by either electrical motor. A first inverter circuit includes a first grouping of switches, wherein each of the first group of switches couples one of the first ends of the windings to the power source. A second inverter circuit includes a second group of switches, each coupling one of the second ends of the windings to the boost link. A controller is coupled to activate each of the first and second groups of switches to thereby allow the electrical energy to be placed on and retrieved from the boost link.

20 Claims, 5 Drawing Sheets

HYBRID MOTOR BOOST SYSTEM AND METHODS

TECHNICAL FIELD

The present invention generally relates to electric motors, and more particularly relates to boost systems for electric motors found in, for example, hybrid vehicles.

BACKGROUND

In a DC-driven electric motor system, such as a hybrid vehicle system with one or more electrical motors, the power of the system is typically increased by enlarging the motor, adding additional magnets to the motor, or boosting the available DC voltage with, for example, a conventional boost DC-DC converter. However, a larger motor typically takes up additional space, additional magnets generally provide additional complexity and weight, and boosting the available DC voltage generally burdens the motor with a higher current rating. Hence, extra power provided by conventional boosting techniques is typically offset by one or more disadvantages.

More recently, inverter circuits have been designed to increase the power provided within an electric motor system. A conventional six-switch, three-leg inverter topology, for example, can increase the power of a system that includes one or more three-phase motors where the DC link is connected across a line-to-line portion of the three-phase motors. Even this topology, however, typically has limitations on its ability to increase available power and/or to decrease the current rating of the inverter.

Accordingly, it is desirable to provide an improved inverter topology for obtaining boost power from a multi-motor system without adding complexity to the system or increasing the motor size. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, an electrical system for a vehicle suitably includes a power source providing electrical power to a first and a second electrical motor. Each motor has two or more windings, and each winding has a first end and a second end. A boost link such as a battery or capacitor is configured to store electrical energy for subsequent retrieval and use by either electrical motor. A first inverter circuit includes a first grouping of switches, wherein each of the first group of switches couples one of the first ends of the windings to the power source. A second inverter circuit includes a second group of switches, each coupling one of the second ends of the windings to the boost link. A controller is coupled to activate each of the first and second groups of switches to thereby allow the electrical energy to be placed on and retrieved from the boost link. Other exemplary embodiments encompass techniques for boosting the power in a multi-motor electrical system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

The present invention will hereinafter be described in conjunction with the following drawing figures, wherein like numerals denote like elements.

DETAILED DESCRIPTION OF EXEMPLARY EMBODIMENTS

The following description generally relates to methods and systems for storing and boosting the electrical power available in a multi-motor electrical system such as that found on many hybrid automobiles, trucks and other vehicles. In this regard, the following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

Figure 1:
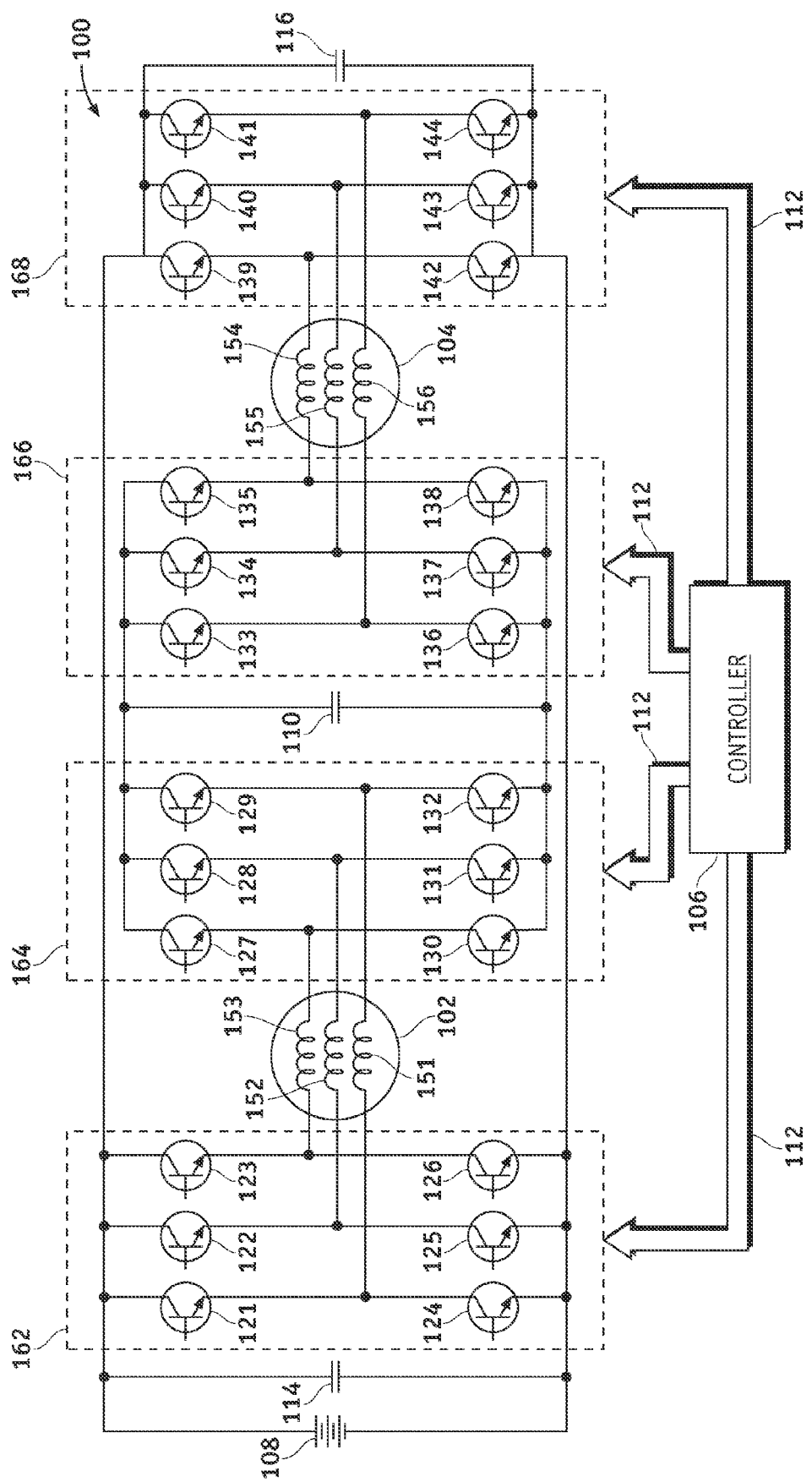
FIG. 1 is a circuit diagram of an exemplary multi-motor electrical system having boost features.

With reference now to the drawing figures and initial reference to FIG. 1, an exemplary electrical system 100 suitable for use in an automobile, truck or other vehicle suitably includes a power source 108 coupled with two or more electrical motors 102, 104. Each motor 102, 104 includes two or more inductive windings 151-153, 154-156 that are switchably coupled back to power source 108 via inverter circuits 162, 168 (respectively). The opposite ends of each winding 151-153, 154-156 are switchably coupled to a boost link 110 via inverter circuits 164, 166 (respectively). In practice, the various switches in inverter circuits 162, 164, 166, 168 receive control signals 112 from controller 106 to place each of the various switches into an appropriate conducting or non-conducting state. By switchably connecting boost link 110 to power source 108 through the windings of motors 102 and 104, then, extra power from boost link 110 can be stored and subsequently applied at appropriate times to either motor 102, 104.

Power source 108 is any battery, generator, fuel cell or other source of electrical energy. Generally, power source 108 corresponds to a conventional hybrid vehicle battery or series of batteries providing direct current (DC) to system 100. Although both motors 102, 104 are shown coupled to the same power source 108 in FIG. 1, in practice each motor 102, 104 could be coupled to a separate power source with or without a common electrical reference (e.g. ground). Protective capacitors 114 and/or 116 may be coupled in parallel or otherwise in communication with power source 108. Such capacitors, when present, can provide signal filtering (e.g. to smooth current ripple) and/or other effects.

Each motor 102, 104 is any type of induction motor or the like having any number of inductive windings (e.g. windings 151-153 and 154-156) corresponding to any number of electrical phases. The embodiment shown in FIG. 1, for example, has three electrical phases, although equivalent embodiments could make use of two, four or any other number of inductive phases. Motors 102, 104 operate according to conventional electrical principles. By alternately connecting the various windings 151-156 to power source 108, for example, various electrical paths can be formed and altered as appropriate to generate mechanical torque applied to any number of wheels, flywheels or other mechanical loads.

Inverter circuits 162, 164, 166 and 168 suitably include any number of transistors, switching elements, relays or other switches 121-144 that are capable of coupling one or more ends of windings 151-156 to each other, to power source 108 and/or to boost link 110 as appropriate. In various embodiments, switches 121-144 are implemented with insulated gate bipolar transistors (IGBTs), metal oxide semiconductor field effect transistors (MOSFETs), and/or the like. Such transistors typically provide a common terminal (e.g. a base or gate terminal) that can be driven to a relatively high or low voltage to thereby enable electrical conductivity between the remaining terminals of the device. Examples of "double-ended" inverter circuitry and various methods of operating such circuits are contained in U.S. Pat. No. 7,154,237, though any other inverter circuitry and/or operating techniques could be equivalently applied in alternate embodiments. For convenience, circuits 162 and 168 may be described herein as a single inverter, since both of these circuits are primarily concerned with coupling motor windings 151-156 to either side of power source 108. Similarly, circuits 164 and 166 may be referenced as a single inverter since both of these circuits are primarily concerned with the sides of windings 151-156 that are not directly coupled to power source 108, but rather may be coupled to boost link 110.

Controller 106 is any device, module, circuitry, logic and/or the like capable of providing control signals 112 to the various components of inverter circuits 162-168. Controller 106 may be implemented with a conventional microprocessor or microcontroller, for example, which would typically include software or firmware instructions stored in volatile or non-volatile digital memory. In other embodiments, controller 106 is implemented with programmed gate arrays, look-up tables or other logic circuitry of any kind. Although not shown in FIG. 1, controller 106 may be physically coupled to switches 121-144 via any type of multiplexing/de-multiplexing or other decoding circuitry to reduce the number of logic pins or other outputs on controller 106 used to provide signals 112.

Boost link 110 is any device, module or other structure capable of storing and releasing electrical energy. In various embodiments, boost link 110 is a capacitor (e.g. a so-called "super-capacitor" having a capacitance on the order of 0.5-20 Farads or so). In other embodiments, boost link 110 is implemented with a battery, fuel cell, flywheel or the like. Boost link 110 is capable of being charged and discharged through the various windings 151-156 to increase or decrease the relative voltage applied across the winding during operating of motors 102, 104. In the embodiment shown in FIG. 1, for example, electrical energy can be applied from power source 108 to boost link 110 via any winding 151-156 through activation and deactivation of various switches 121-144 in inverter circuits 162-168.

In the embodiment shown in FIG. 1, each of the windings 151-156 can be switchably coupled to either the positive or negative terminals of power source 108 by inverter circuits 162 and 168, respectively, thereby allowing either full rail voltage (e.g. the full voltage applied by power source 108, $B^+$, $B^-$, ground, or any other applied voltage) to be applied in either direction across any winding 151-156. Switches 121-123, for example, switchably couple windings 151-153 (respectively) to the positive voltage (or primary) side of power source 108, while switches 124-126 couple windings 151-153 (respectively) to the opposite (e.g. negative or reference) side of power source 108. Similarly, switches 139-141 switchably couple windings 154-156 to the positive voltage side of power source 108, and switches 142-144 couple windings 154-156 to the negative side of power source 108. To apply a positive or negative voltage across any particular winding 151-156, then, one or more switches associated with the winding can be activated. To couple winding 153 to the positive side of power source 108, for example, switch 123 is activated, while switches 121 and 122 typically remain closed to prevent current from entering coils 152 and 151, respectively. Similarly, winding 154 can be coupled to the opposite side of power source 108 by activating switch 142. Again, any of the windings 151-156 on either motor 102, 104 can be coupled to either the primary or opposite side of power source 108 by simply actuating and/or de-actuating the various switches 121-126 and 139-144.

The opposing ends of the windings 151-156 can be similarly coupled to each other in any type of arrangement (e.g. a wye-junction) as appropriate through actuation and de-actuation of switches 127-138. Activating switches 127, 128 and 129, for example (or switches 130-132) would place the three windings 151-153 in motor 102 into a "wye" arrangement. The various switches 127-138 in inverter circuits 154, 166 are also able to switchably couple windings 151-156 to boost link 110 as appropriate.

By placing electrical energy on boost link 110 during motor operation, energy can be stored for subsequent retrieval by either motor 102, 104. The various motor windings 151-156 thereby serve to separate two effective power sources (i.e. source 108 and boost link 110), which in turn allows boost link 110 to serve as a source of additional voltage applied across any winding 151-156. Either motor 102, 104 may provide power to boost link 110 through conventional pulse width modulation methods, for example, and stored power is subsequently available to either motor 102, 104 to create positive or negative torque. Various techniques for placing and retrieving electrical energy from boost link 110 are described below.

Figure 2:
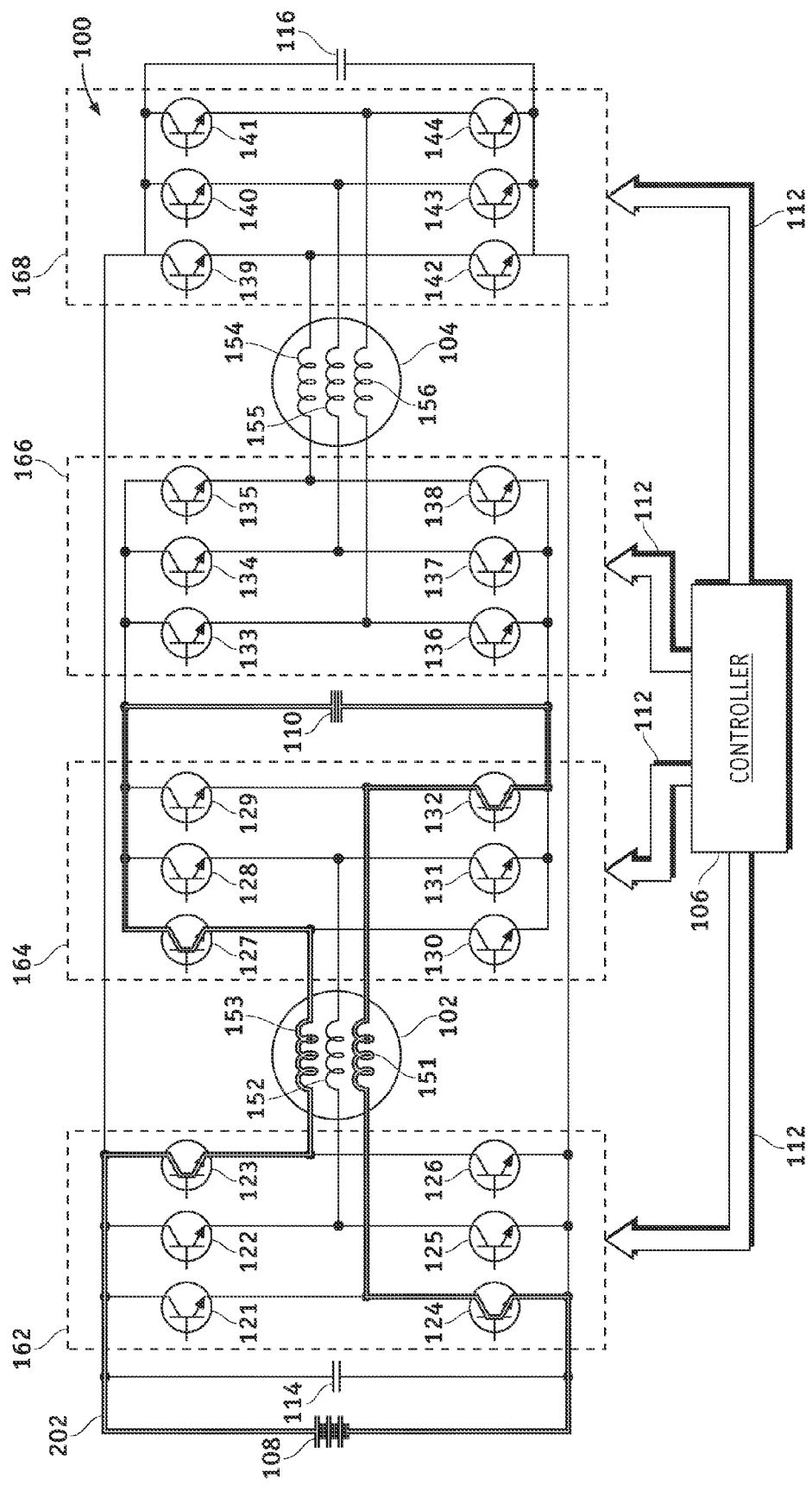
FIG. 2 is a circuit diagram showing one circuit path for transferring electrical energy from the power source to the boost link.

Referring now to FIG. 2, an exemplary technique for placing electrical energy on boost link 110 suitably involves placing boost link 110 into a circuit with power source 108. By activating switches 123, 124, 127 and 132, for example, a current path is formed from the primary terminal of power source 108 through winding 153 and boost link 110, returning through winding 151 to the opposing side of power source 108. Note that any other current path through any two windings 151-156 could be used in the alternative, including any of the paths shown in FIGS. 3-5. As boost link 110 is switched into the circuit, charge is stored as appropriate. The stored charge is then available for discharge and/or recharge during subsequent operation of motors 102, 104.

Figure 3:
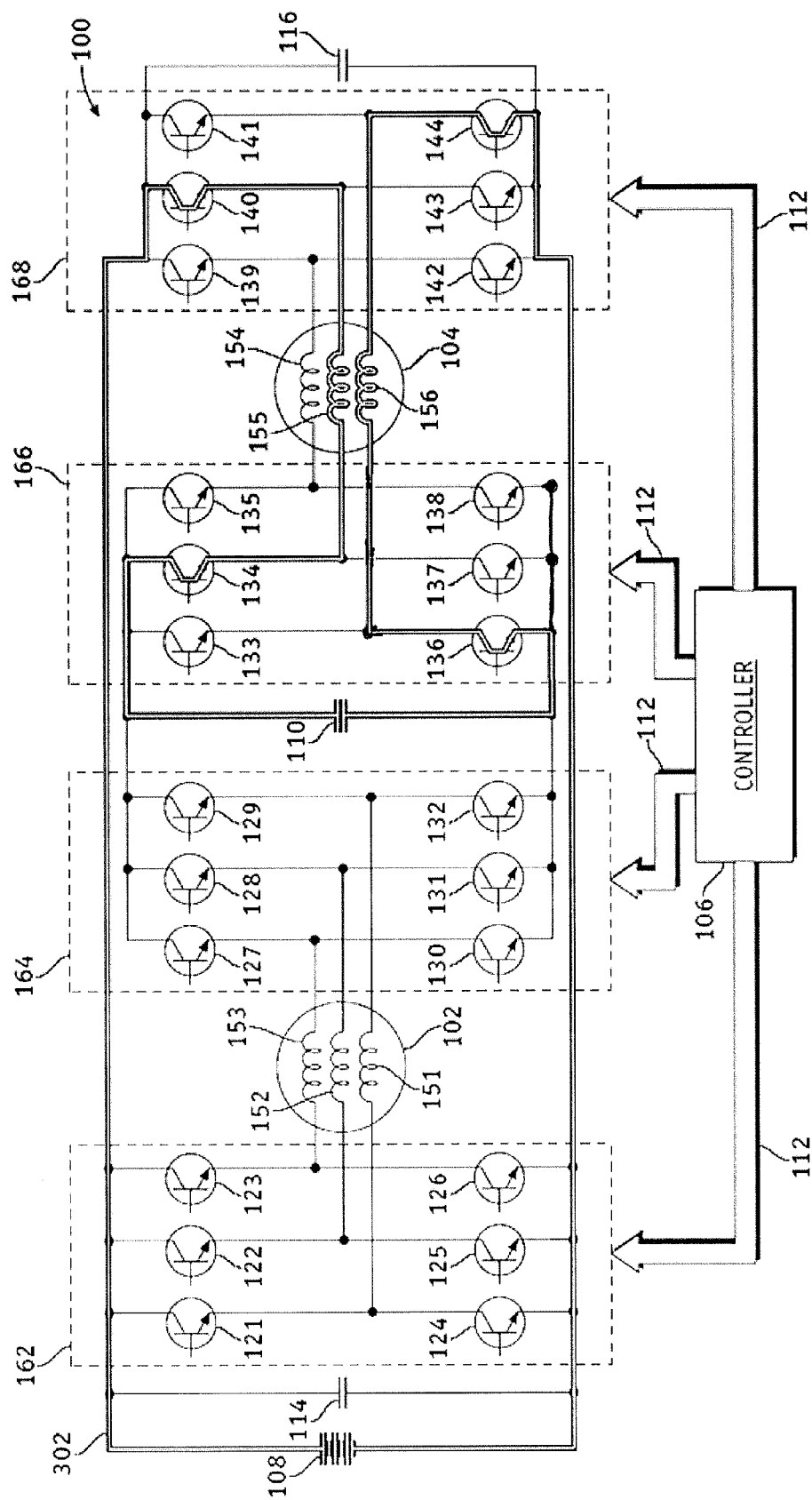
FIG. 3 is a circuit diagram showing one circuit path for retrieving electrical energy stored on the boost link to an electrical motor.
Figure 4:
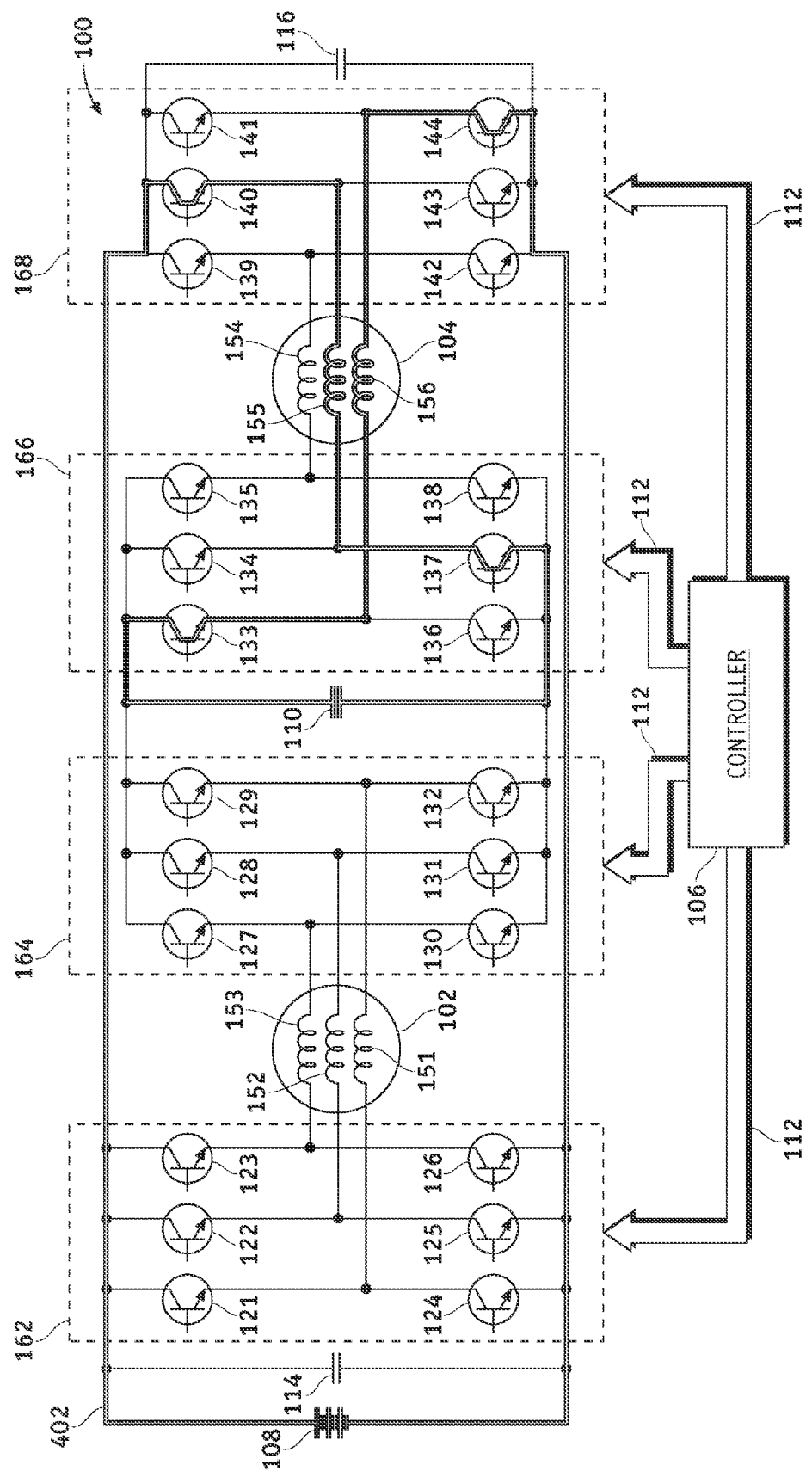
FIG. 4 is a circuit diagram showing an alternate circuit path for retrieving electrical energy stored on the boost link.

FIGS. 3 and 4, for example, show exemplary techniques for coupling boost link 110 into a circuit that includes windings 155 and 156 of motor 104. These circuits could be timed to charge boost link 110, or to discharge energy previously stored in any way. FIG. 3, for example, shows switches 134, 136, 140 and 144 activated to create a circuit 302 from power source 108 through winding 155 to boost link 110, with a return path through winding 156 back to power source 108. If boost link 110 had been previously charged, the energy on the boost link could be discharged across winding 156, thereby increasing the voltage across the winding and resulting in additional torque produced by motor 104.

FIG. 4 shows a similar circuit 402, with switches 133 and 137 activated in place of switches 134 and 138; switches 140 and 144 remain activated as in FIG. 3. In the FIG. 4 arrangement, however, the energy applied by boost link 110 is reversed, thereby serving to reduce the voltage across winding 156 (or, alternatively, to increase the voltage across winding 155).

Figure 5:
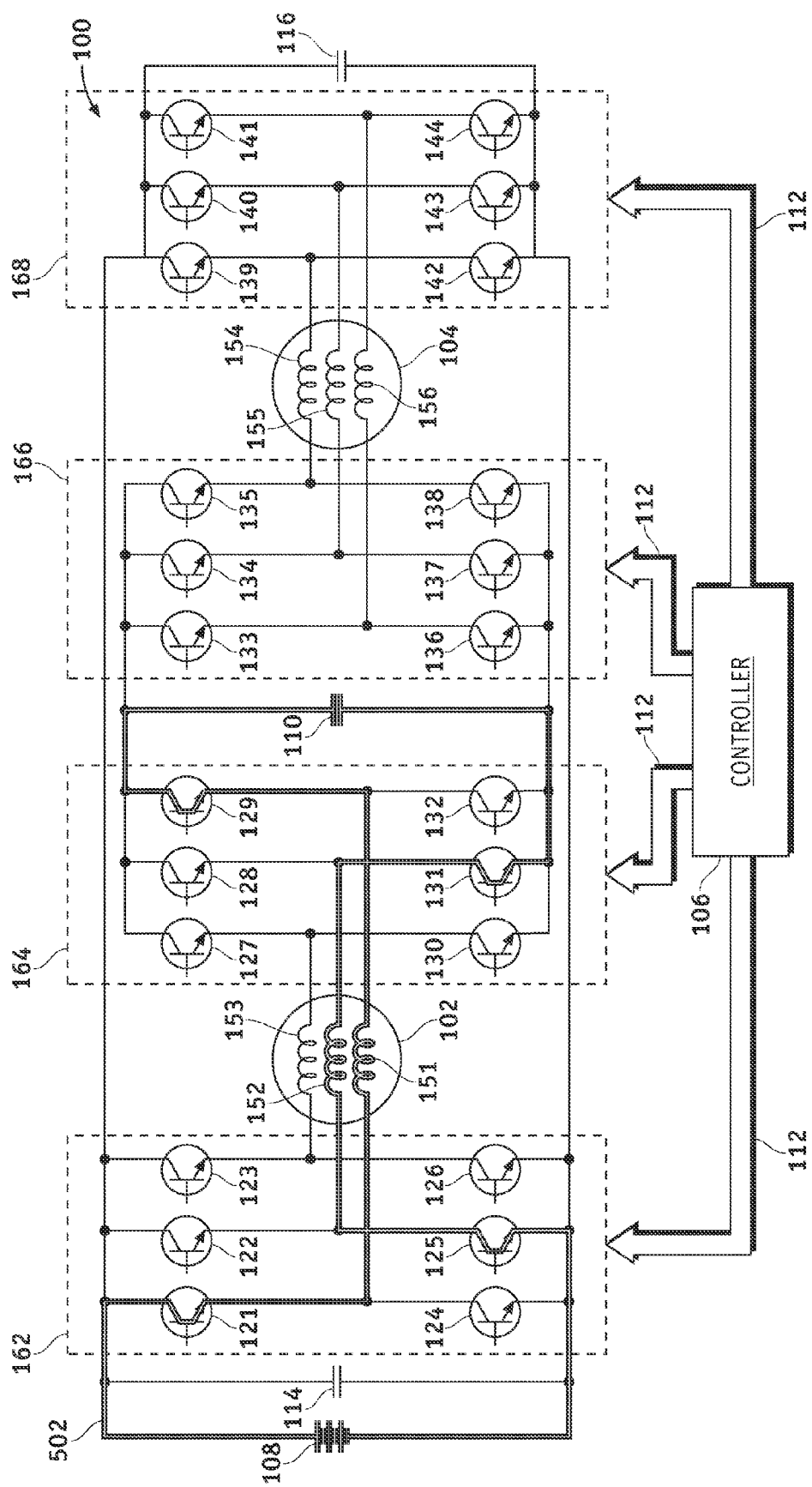
FIG. 5 is a circuit diagram showing another alternate circuit path for retrieving electrical energy stored on the boost link.

With final reference now to FIG. 5, switches 121, 125, 129 and 131 are shown activated to create a circuit 502 through windings 152 and 153 for charging and/or discharging boost link 110. As noted above, any number of circuits for charging and/or discharging the energy stored on boost link 110 could be formulated and applied during motor operation. Each of these circuits can be created through simple application of control signals 112 to the switches 121-144. The switches may be activated and/or de-activated through simple application of proper voltages to the base or gate terminals of transistor switches, for example, or according to any other technique. Digital instructions in software, firmware or any other format can therefore be executed within controller 106 to create appropriate control signals 112, to control the timing and sequencing of such signals 112, and to otherwise direct the operation of system 100 as appropriate.

The techniques described above may be applied in any number of environments and applications. In the vehicle context, boost circuitry can be readily deployed in a hybrid vehicle to allow for "boosting" and/or "bucking" of voltage between electric motors. Similar concepts may be readily applied in the context of any automotive, transportation, aerospace, industrial and/or setting as appropriate.

While several exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electrical system comprising:
   a power source;
   a first electrical motor and a second electrical motor each having a plurality of windings, and each of the windings having a first end and a second end;
   a boost link switchably coupled between the first and second electrical motors and configured to store electrical energy;
   an first inverter circuit comprising a first plurality of switches, wherein each of the first plurality of switches is configured to switchably couple one of the first ends of the windings to the power source;
   a second inverter circuit comprising a second plurality of switches, wherein each of the second plurality of switches is configured to switchably couple one of the second ends of the windings to the boost link; and
   a controller coupled to each of the first and second pluralities of switches and configured to activate each of the first and second pluralities of switches to thereby allow the electrical energy to be placed on and retrieved from the boost link.

2. The system of claim 1 wherein the first and second inverter circuits each comprise a first portion associated with the first electrical motor and a second portion associated with the second electrical motor.

3. The system of claim 1 wherein the controller is further configured to transfer the electrical energy from the power source to the boost link through the first electrical motor.

4. The system of claim 3 wherein the controller is further configured to apply the electrical energy from the boost link to the second electrical motor.

5. The system of claim 1 wherein the controller is further configured to place the electrical energy on the boost link by activating one of the first plurality of switches and one of the second plurality of switches, wherein each of the activated switches are coupled to a common one of the plurality of windings associated with the first electrical motor.

6. The system of claim 1 wherein the controller is further configured to place the electrical energy on the boost link by activating a second one of the first plurality of switches and a second one of the second plurality of switches, wherein each of the second activated switches are coupled to a common second one of the plurality of windings associated with the first electrical motor.

7. The system of claim 6 wherein the controller is further configured to retrieve the electrical energy from the boost link by activating a third one of the first plurality of switches and a third one of the second plurality of switches, wherein each of the third activated switches are coupled to a common third one of the plurality of windings associated with the second electrical motor.

8. The system of claim 7 wherein the controller is further configured to retrieve the electrical energy from the boost link by activating a fourth one of the first plurality of switches and a fourth one of the second plurality of switches, wherein each of the fourth activated switches are coupled to a common fourth one of the plurality of windings associated with the second electrical motor.

9. The system of claim 1 wherein the first plurality of switches comprises a first subset of switches each coupled to a positive terminal of the power source and a second subset of switches each coupled to a negative terminal of the power source.

10. The system of claim 1 wherein each of the second plurality of switches are electrically isolated from the power source by at least one of the plurality of windings in either the first or the second electrical motor.

11. The system of claim 1 further comprising a filter capacitor coupled in parallel with the first inverter circuit.

12. The system of claim 11 further comprising a second filter capacitor coupled in parallel with the first inverter circuit.

13. The system of claim 1 wherein the boost link comprises a battery.

14. The system of claim 1 wherein the boost link comprises a capacitor.

15. The system of claim 1 wherein the capacitor is a supercapacitor.

16. An electrical system for a vehicle comprising a power source, a first electrical motor and a second electrical motor each having a plurality of windings, and each of the windings having a first end and a second end, and a boost link configured to store electrical energy, wherein the electrical system comprises:
   a first inverter comprising a first plurality of switches each configured to switchably couple one of the first ends of the windings to the power source;
   a second inverter comprising a second plurality of switches, wherein each of the second plurality of switches is configured to switchably couple one of the second ends of the windings to the boost link; and
   a controller configured to activate each of the first and second pluralities of switches to allow the electrical energy to be transferred from the power source to the boost link via one of the windings of the first electrical motor and to further allow the electrical energy to be applied from the boost link to the second electrical motor.

17. In an electrical system for a vehicle comprising a power source, a boost link, and first and second electrical motors each having a plurality of windings, a method of transferring electrical energy comprising the steps of:
   transferring electrical energy from the power source to the boost link via a first and a second winding of the first motor to store the electrical energy on the boost link; and
   subsequently retrieving the electrical energy from the boost link to the second motor by coupling a first winding and a second winding of the second motor to the boost link.

18. The method of claim 17 wherein the transferring step comprises switchably coupling a first end of a first winding and a second winding of the first motor to the power source, and switchably coupling a second end of the first and second windings to the boost link.

19. The method of claim 18 wherein the retrieving step comprises switching first ends of a third winding and a fourth winding of the second motor to the power source, and second ends of the third and fourth windings to the boost link.

20. The method of claim 19 wherein the retrieving step comprises applying the electrical energy from the boost link to the second motor in a manner that opposes electrical energy applied to the second motor by the power source.

* * * * *